(12) United States Patent
Wilcox et al.

(10) Patent No.: US 7,072,851 B1
(45) Date of Patent: Jul. 4, 2006

(54) SYSTEM AND METHOD FOR ADMINISTRATING A CREDIT CARD USE INCENTIVE PROGRAM BY WHICH A CREDIT CARD HOLDER EARNS REBATE IN THE FORM OF AN ADDITIONAL PAYMENT TOWARD AN OUTSTANDING LOAN PRINCIPAL TO REDUCE OVERALL COST OF THE INSTALLMENT LOAN

(75) Inventors: Warren S. Wilcox, Willow Grove, PA (US); Edmond I. Eger, Wayne, PA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 09/292,887

(22) Filed: Apr. 16, 1999

(51) Int. Cl.
*G06F 17/60* (2006.01)

(52) U.S. Cl. .......................... 705/14; 705/35
(58) Field of Classification Search .............. 705/14, 705/35
See application file for complete search history.

(56) References Cited

U.S. PATENT DOCUMENTS

| | | | |
|---|---|---|---|
| 4,750,119 A | 6/1988 | Cohen et al. ................. | 705/14 |
| 5,117,355 A | 5/1992 | McCarthy ..................... | 705/14 |
| 5,206,803 A | 4/1993 | Vitagliano et al. ............ | 705/39 |
| 5,233,514 A | 8/1993 | Ayyoubi et al. .............. | 705/14 |
| 5,287,268 A | 2/1994 | McCarthy ..................... | 705/14 |
| 5,297,026 A | 3/1994 | Hoffman ....................... | 705/14 |
| 5,513,102 A | 4/1996 | Auriemma .................... | 705/14 |
| 5,787,404 A * | 7/1998 | Fernandez-Holmann ..... | 705/35 |
| 5,806,045 A | 9/1998 | Biorge et al. ................. | 705/14 |
| 6,070,153 A * | 5/2000 | Simpson ....................... | 705/36 |

FOREIGN PATENT DOCUMENTS

CA      2237109 A   * 11/1998

OTHER PUBLICATIONS

"Wells Fargo links its plastic with mortgages", San Francisco Examiner, Apr. 16, 1993, p. C1. Dialog file 16, document 02812176.*

Borowsky, Mark, "Wells Fargo credit card is a natural advantage", Bank Management v. 69 No. 6 (Jun. 1993): 18-22. Dialog file 15, document 00729051.*

"CardTrak—More in Ninety-Four", from the Jan. 1994 issue of CardTrak, three pages copied on Apr. 2, 2001 from http://www.cardweb.com/cardtrak/pastissues/ct_jan94.html.*

* cited by examiner

*Primary Examiner*—Donald L. Champagne
(74) *Attorney, Agent, or Firm*—Leah Sherry; Michael A. Springs

(57) ABSTRACT

A credit card incentive program wherein a credit card issuer issues a credit card to a credit card holder, who has an outstanding installment loan account with a lending institution; wherein the credit card holder can earn a periodic rebate through use of the credit card, which rebate is in the form of a payment to the lending institution made by the credit card issuer on behalf of the credit card holder; and wherein the payment is applied against the outstanding principal on the installment loan account.

24 Claims, 6 Drawing Sheets

SYSTEM AND METHOD FOR ADMINISTRATING A CREDIT CARD USE INCENTIVE PROGRAM BY WHICH A CREDIT CARD HOLDER EARNS REBATE IN THE FORM OF AN ADDITIONAL PAYMENT TOWARD AN OUTSTANDING LOAN PRINCIPAL TO REDUCE OVERALL COST OF THE INSTALLMENT LOAN

The present invention relates to a system and method for administering a credit card incentive program. More particularly, the present invention relates to a credit card incentive program wherein a credit card issuer issues a credit card to a credit card holder, who has an outstanding installment loan account with a lending institution; wherein the credit card holder can earn a periodic rebate through use of the credit card, which rebate is in the form of a payment to the lending institution made by the credit card issuer on behalf of the credit card holder; and wherein the payment is applied against the outstanding principal on the installment loan account.

Many consumers have installment loans, e.g. mortgage loans, whereby they repay the principal amount borrowed along with interest over time to a lending institution. While most installment loans, including mortgage loans, permit borrowers to prepay principal without a penalty, the typical borrower rarely does so voluntarily, notwithstanding the fact that the early payment of principal can significantly reduce the amount paid to the lending institution by reducing the amount of interest accrued on the installment loan.

Also, many consumers have increasingly come to rely on credit cards as a means for deferring current payment for the costs of goods and services. In addition, many credit card issuers offer consumers awards based on the amount of goods and services purchased by the consumer. For example, U.S. Pat. No. 5,287,268 issued to McCarthy describes a system that credits a consumer's credit card account based on the amount of only those purchases made with merchants participating in the awards program. The McCarthy system requires merchants to opt to participate in the awards program. Accordingly, the success or failure of the awards program as an incentive to use a particular credit card to make consumer purchases depends in large part upon the number and variety of merchants willing to participate in the awards program.

Another credit-card based system is disclosed in U.S. Pat. No. 5,787,404 issued to Fernandez-Holmann. Fernandez-Holmann disclose a credit card-based system through which an investment account is periodically funded through automatic charges on the credit card. The Fernandez-Holmann system also provides for purchase rebates, whereby the investment account is further funded with a payment representing a specified percentage of the value of goods and services purchased with the credit card. While the Fernandez-Holmann system is transparent to the merchants from whom the credit card purchases are made overcoming the problem of merchant participation plaguing the McCarthy system, the Fernandez-Holmann system requires the credit card holder to have sufficient disposable income to facilitate contributions to an investment account.

What is needed is a system whereby consumers can reduce the cost of an installment loan through the use of a credit card for making consumer purchases which the consumers were likely to make anyway. That is, what is needed is a system whereby consumers can earn a periodic rebate in the form of a payment against the principal due on an installment loan, which payment is made by a credit card issuer as part of an incentive program which rewards the consumer for using the credit card issuer's credit card to make consumer purchases, purchases which the consumer was likely to make anyway using cash, check or a credit card notwithstanding the existence of the incentive program of the present invention.

SUMMARY OF THE INVENTION

The present invention provides a credit card incentive program wherein a credit card issuer issues a credit card to a credit card holder, who has an outstanding installment loan account with a lending institution; wherein the credit card holder can earn a periodic rebate through use of the credit card, which rebate is in the form of a payment to the lending institution made by the credit card issuer on behalf of the credit card holder; and wherein the payment is applied against the outstanding principal on the installment loan account.

In accordance with the present invention, a credit card incentive system is provided wherein a credit card issuer makes a payment on behalf of a credit card holder to a lending institution to be applied against outstanding principal on a note for a loan made to the credit card holder, which note is held by the lending institution. The payment is preferably made on a periodic basis, most preferably once a year. In addition, the payment is preferably made by check or wire transfer. Most preferably, the payment is made by wire transfer if the amount of the payment exceeds a minimum value, otherwise the payment is made by check.

In accordance with the present invention, the size of the payment made on behalf of the credit card holder is determined based on the value of goods and services purchased by the credit card holder using a credit card issued by the credit card issuer. Preferably, the size of the payment is calculated as a straight percentage of the value of goods and services purchased by the credit card holder using the credit card issued by the credit card issuer. More preferably, the size of the payment is calculated as an incremented percentage of the value of goods and services purchased by the credit card holder using the credit card issued by the credit card issuer. Most preferably, the size of the payment will include an additional amount determined based on the amount of interest charged the credit card holder by the credit card issuer on the credit card account. Preferably, the additional amount will be calculated as a straight percentage of the amount of any interest charged to the credit card holder by the credit card issuer. More preferably, the additional amount will be calculated as an incremented percentage of the amount of any interest charged to the credit card holder by the credit card issuer.

In accordance with the present invention, a computerized method for providing credit card incentive payments is provided, including: (a) establishing a credit card account between a credit card issuer and a credit card holder, wherein the credit card holder has a loan with an outstanding principal balance for which a lending institution holds a note; (b) issuing a credit card to the credit card holder; (c) periodically calculating the value of all purchases made by the credit card holder using the credit card during a period of time; (d) periodically calculating an installment loan benefit amount; and, (e) periodically paying to the lending institution the installment loan benefit amount, wherein the installment loan benefit amount is applied against the outstanding principal balance on the note. The installment loan benefit amount is preferably paid to the lending institution on a periodic basis, most preferably once a year. In addition, the installment loan benefit amount is preferably paid to the lending institution by check or wire transfer. Most preferably, the installment loan benefit amount is paid by wire transfer if the amount of the installment loan benefit amount exceeds a minimum value, otherwise the installment loan benefit amount is paid by check.

In accordance with the present invention, the size of the installment loan benefit amount paid on behalf of the credit card holder is determined based on the value of goods and services purchased by the credit card holder using a credit card issued by the credit card issuer. Preferably, the size of the installment loan benefit amount paid is calculated as a straight percentage of the value of goods and services purchased by the credit card holder using the credit card issued by the credit card issuer. More preferably, the size of the installment loan benefit amount paid is calculated as an incremented percentage of the value of goods and services purchased by the credit card holder using the credit card issued by the credit card issuer. Most preferably, the size of the installment loan benefit amount will include an additional amount determined based on the amount of interest charged the credit card holder by the credit card issuer on the credit card account. Preferably, the additional amount will be calculated as a straight percentage of the amount of any interest charged to the credit card holder by the credit card issuer. More preferably, the additional amount will be calculated as an incremented percentage of the amount of any interest charged to the credit card holder by the credit card issuer.

DETAILED DESCRIPTION

Figure 1:
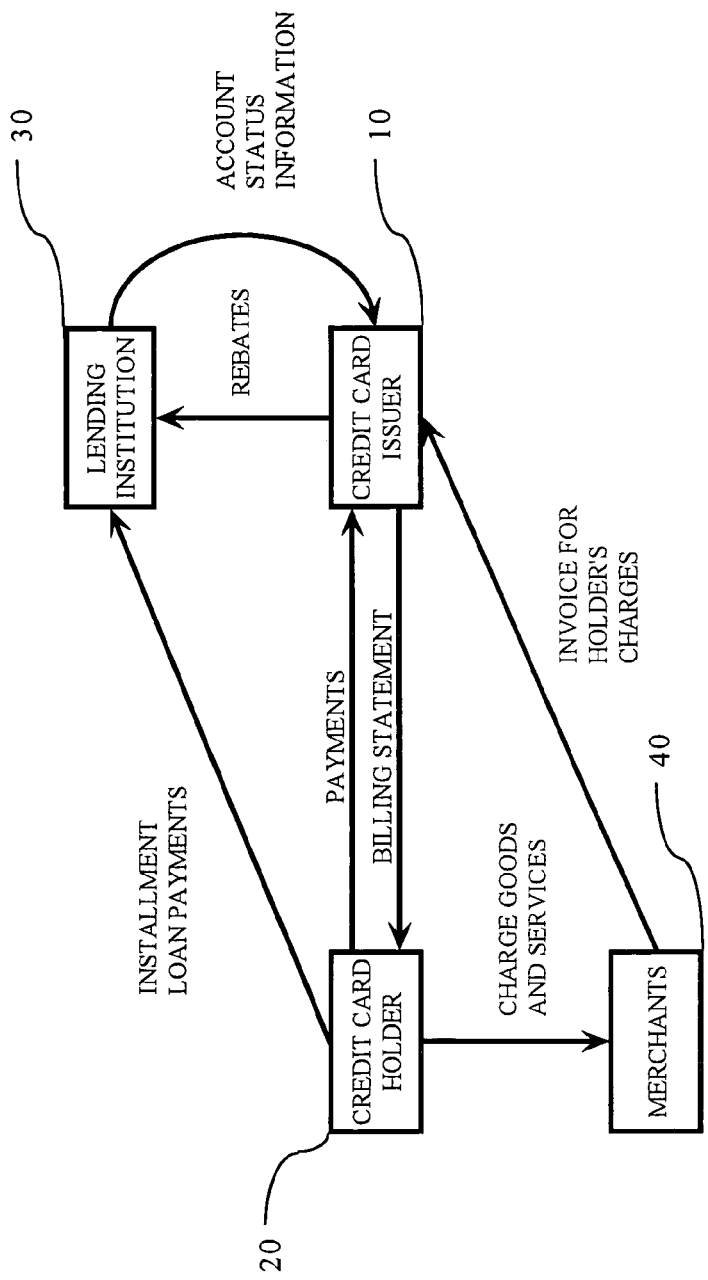
FIG. 1 is a block diagram of the system of the present invention.

With reference to the Figures herein, the preferred embodiments of the present invention will now be described in detail. FIG. 1 provides a block diagram of the system components of the preferred embodiments and the transactional components therebetween. A credit card issuer 10 provides a credit card to a credit card holder 20, having an installment loan account with a lending institution 30. The credit card holder 20 may use the credit card to make purchases from merchants 40. The interaction between the credit card issuer 10, the credit card holder 20 and the merchants 40 is well known in the art. The installment loan account may comprise any loan instrument, but will preferably comprise a home mortgage. In addition, the credit card issuer 10 will make payments to the lending institution 30 to be applied against the outstanding principal on the credit card holder's 40 installment loan account with the lending institution 30. These payments constitute a rebate to the credit card holder 40 in the form of an installment loan benefit amount (ILBA), as will be described in detail below.

Figure 2:
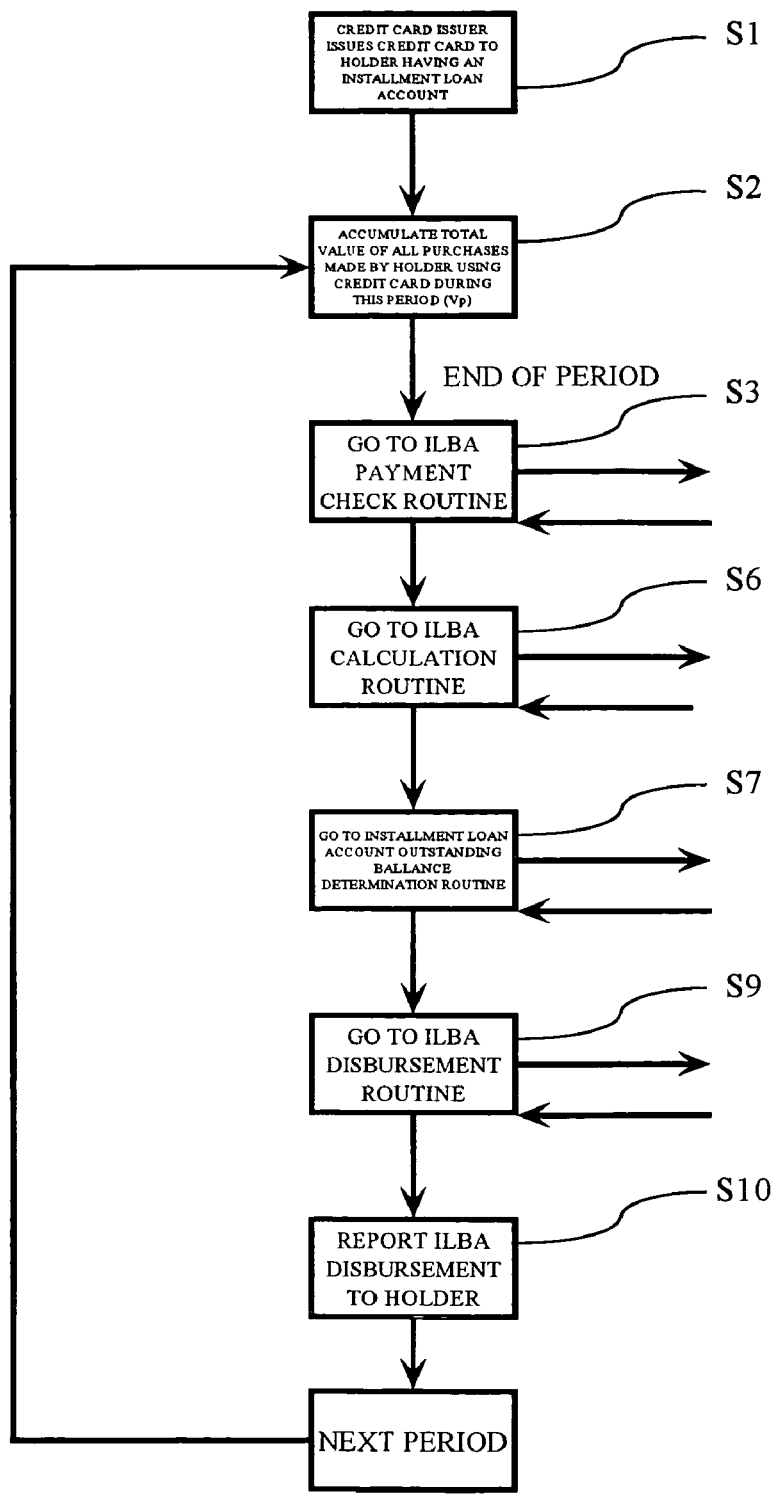
FIG. 2 is a flowchart of a preferred embodiment of the system of the present invention, whereby a credit card holder earns a periodic rebate by making purchases with a credit card issued by a credit card issuer, wherein the periodic rebate is in the form of an installment loan benefit paid by the credit card issuer to a lending institution with which the credit card holder has an outstanding installment loan.

The system of the present invention is carried out by first establishing a credit card account with a credit card issuing entity 10, typically a bank or other financial institution, for the benefit of a credit card holder 20, who has an outstanding installment loan account with a lending institution 30, typically a bank or other financial institution; as shown in FIG. 2 as step S1. The credit card account is established using any known method. The credit card account established may or may not have a preset spending limit or credit line, depending on the particular requirements of the credit card issuer 10.

At step S2 the total value of the purchases (Vp) made by the credit card holder 20 using the credit card during a given period is determined. While it can theoretically be any length of time, the period is preferably one year in length.

Figure 3:
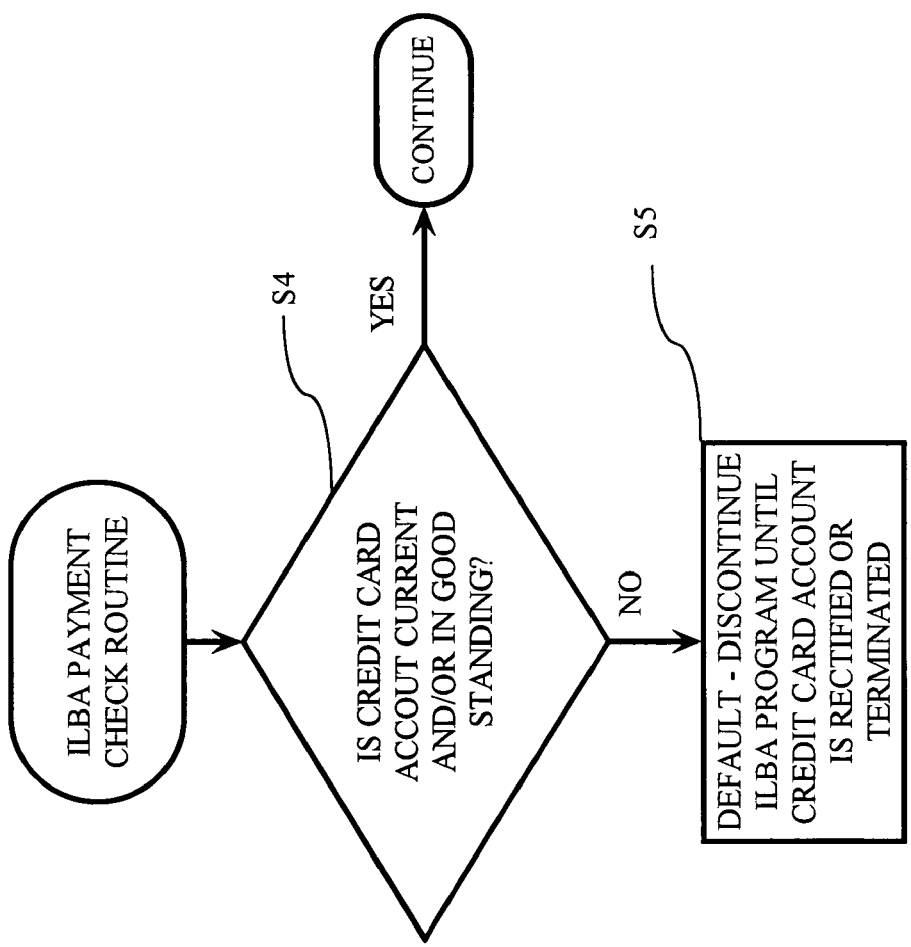
FIG. 3 is a flowchart of a subroutine of the embodiment depicted in FIG. 2, which subroutine facilitates the verification that the credit card holder's credit card account is current and/or in good standing.

At step S3, at the end of a given period, an ILBA payment check routine is performed. Specifically, it is determined whether the credit card holder's 20 credit card account is current and/or in good standing, i.e., has the credit card holder 20 made the required payments under the credit card account agreement through which the credit card was issued, see FIG. 3, step S4. If it is determined that the credit card holder 20 is in default of the credit card account agreement and/or that the credit card account is not in good standing, the ILBA incentive program is discontinued, step S5.

Alternatively, if it is determined in step S4 that the credit card account is current and in good standing, the ILBA is calculated in step S6. The ILBA may be a straight percentage of the Vp for a given period. That is, the ILBA may be calculated by simply multiplying the Vp for a given period by a single preset benefit percentage, B %, namely, ILBA=Vp×B %.

Figure 4:
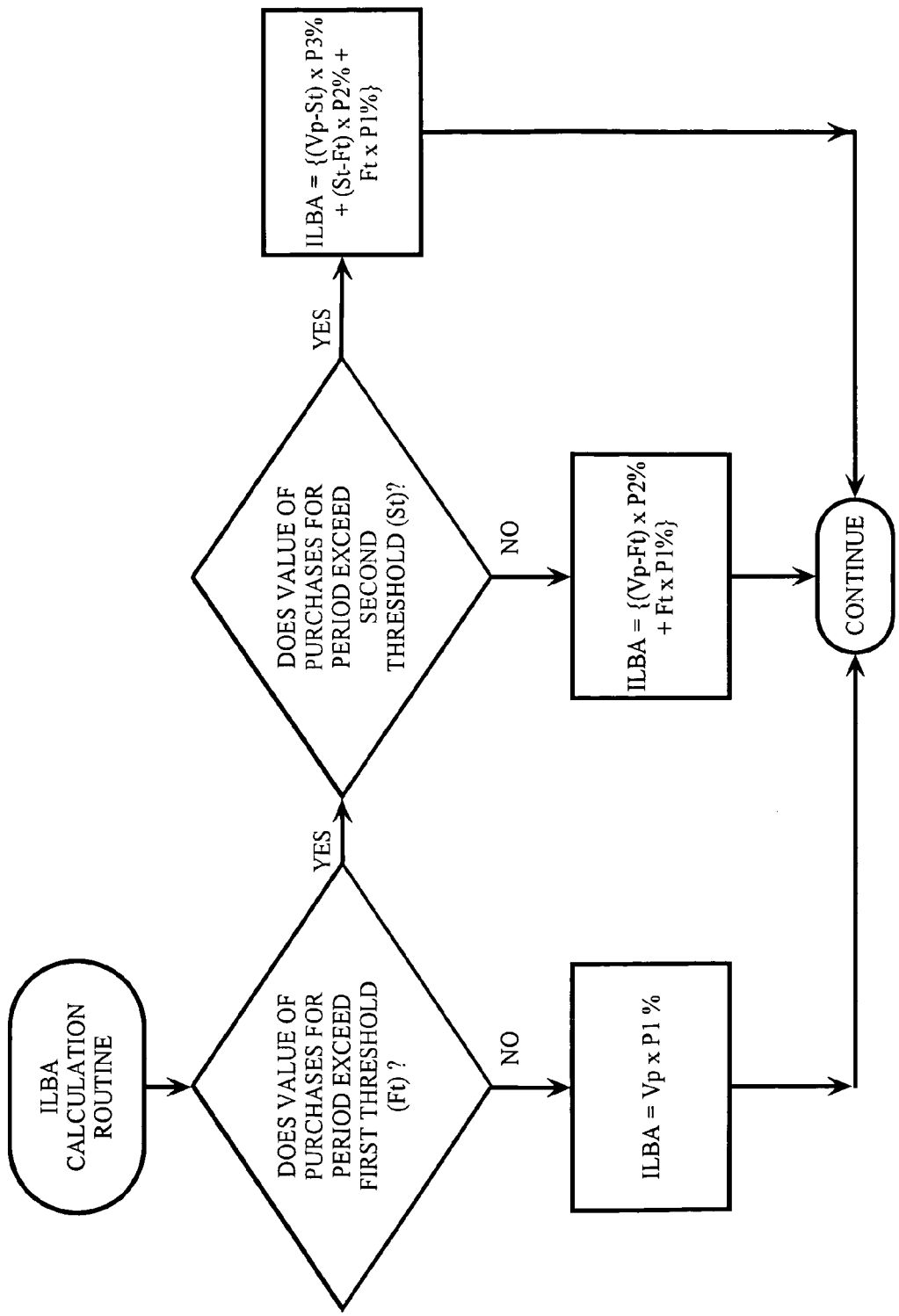
FIG. 4 is a flowchart of a subroutine of the embodiment depicted in FIG. 2, which subroutine facilitates the calculations for a preferred three tier incremented percentage based installment loan benefit amount.

Alternatively, the ILBA may be an incremented percentage of the Vp for a given period. That is, the ILBA may be calculated by multiplying two or more defined increments of the Vp with different preset benefit percentages. Preferably, the ILBA will comprise a three tier incremented percentage of the Vp for a given period, see FIG. 4. Under this alternative, the ILBA may be calculated using one of the following formulas depending on the amount of the calculated Vp, namely:

(i) if the Vp is less than a first threshold amount, Ft, the ELBA is calculated as follows:

$ILBA = Vp \times P1\%$ wherein P1% is the first tier benefit percentage. Note that this calculation is identical to that used when the ILBA is simply a straight percentage of the Vp.

(ii) if the Vp exceeds the first threshold amount, Ft, but is less than the second threshold amount, St, the ILBA is calculated as follows:

$ILBA = \{(Vp - Ft) \times P2\% + Ft \times P1\%\}$ wherein P2% is the second tier benefit percentage.

(iii) if the Vp exceeds the second threshold amount, St, the ILBA is calculated as follows:

$$ILBA=\{(Vp-St)\times P3\%+(St-Ft)\times P2\%+Ft\times P1\%\}$$

wherein P3% is the third tier benefit percentage.

The specific values for Ft, St, P1%, P2%, and P3% may be selectively set by the credit card issuer.

For example, with a three tier incremented percentage set up using the following criteria:

| Purchase thresholds | Benefit percentages |
| --- | --- |
| <$2,000 | ½% (P1%) |
| $2,000 (Ft) to $4,999 | 1% (P2%) |
| $5,000 (St) and up | 2% (P3%). |

A credit card holder making a total of $12,000 purchases during a given period will be entitled to an ILBA payment of $180. That is, the credit card holder 20 will receive a rebate from the credit card issuer 10 in the form of an ILBA payment in an amount equal to ½% of all purchases totaling less than $2,000, plus an amount equal to 1% of all purchases in excess of $2,000 but less than $5,000, plus an amount equal to 2% of all purchases in excess of $5,000, for a given period, namely $$ILBA=\{(\$12,000-\$5,000)\times 2\%+\$3,000\times 1\%+\$2,000\times \tfrac{1}{2}\%\}=\$180$$

In a preferred embodiment of the present invention, regardless whether the ILBA comprises a straight or incremented percentage, it is preferred that the ILBA benefit has a maximum capped amount for any given period. The maximum ILBA benefit may be set at any given amount and may be increased or decreased periodically. That is, for example, the maximum ILBA benefit that may be earned for a given period may be capped at $500. Thus, in this example, no matter how large the Vp, the ILBA earned by the credit card holder during any given period could not exceed the capped amount of $500.

In a preferred embodiment of the present invention, the ILBA may further include an additional amount equal to a straight percentage of the interest/finance charges accrued on the credit card holder's credit card account during the period. Alternatively, the additional amount may equal an incremented percentage of the interest/finance charges accrued on the credit card holder's credit card account during the period. Typically, such interest/finance charges are the result of the maintenance of and outstanding balance on the credit card account, i.e., the credit card holder makes a payment to the credit card issuer of something less than the full balance due on the credit card account at the end of a given period.

Figure 5:
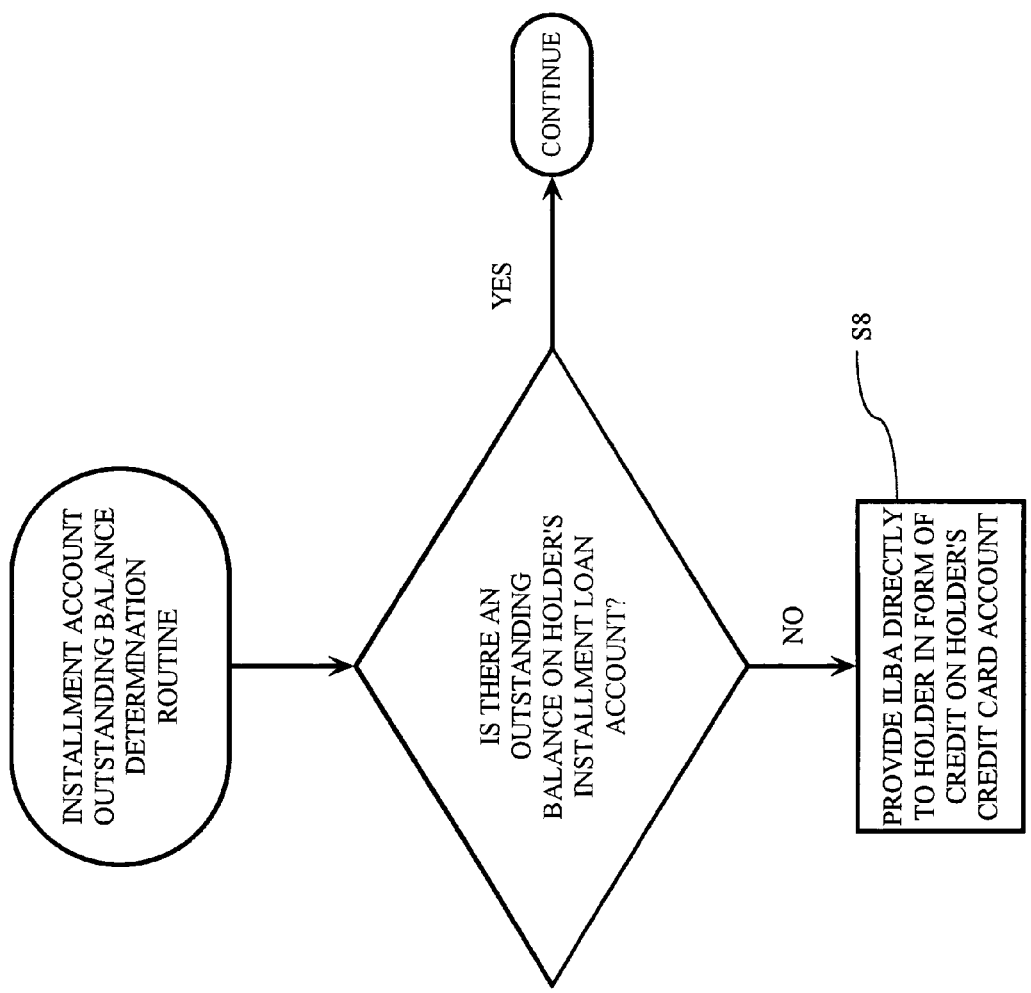
FIG. 5 is a flowchart of a subroutine of the embodiment depicted in FIG. 2, which subroutine facilitates the verification that there continues to be an outstanding principal balance on the credit card holder's installment loan account; and, FIG. 6 is a flowchart of a subroutine of the embodiment depicted in FIG. 2, which subroutine facilitates the determination of the method by which the installment loan benefit amount will be disbursed to the lending institution.

At step S7, an installment loan account outstanding balance determination routine is performed. This routine comprises a periodic verification that the credit card holder 20 continues to have an outstanding installment loan with the lender 30, see FIG. 5. This periodic verification can theoretically be performed using any length of time as the period. Preferably, however, this periodic verification is performed on an annual basis. The credit card issuer 10 can verify that the credit card holder 20 continues to have an outstanding installment loan with the lending institution 30 and the principal balance remaining on that loan through communication with the credit card holder 20. Alternatively, the credit card issuer 10 can obtain authorization from the credit card holder 20 to periodically verify that the credit card holder 20 continues to have an outstanding installment loan with the lending institution 30 and the principal balance remaining on that loan through communication with the lending institution 30.

During the installment loan verification step S7, the credit card holder 20 will be afforded the opportunity to advise the credit card issuer 10 of any change in the identity of the lending institution 30. For example, the credit card holder 20 will be given the opportunity to advise the credit card issuer 10 of a change in the identity of the lending institution 30 holding the note for the installment loan precipitated by, for example, a refinancing of the installment loan through a different bank or financial institution. The credit card holder 20 will also be afforded the opportunity to advise the credit card issuer 10 that the installment loan has been satisfied. In this situation, the credit card holder 20 will have the option to substitute another installment loan account, or to receive the ILBA as a direct rebate. In the event the credit card holder 20 opts to receive the ILBA as a direct rebate, the credit card issuer 10 may provide such rebate in the form of a check payable to the credit card holder 10 or, alternatively, in the form of a credit on the credit card holder's 10 credit card account with the credit card issuer 20.

Figure 6:
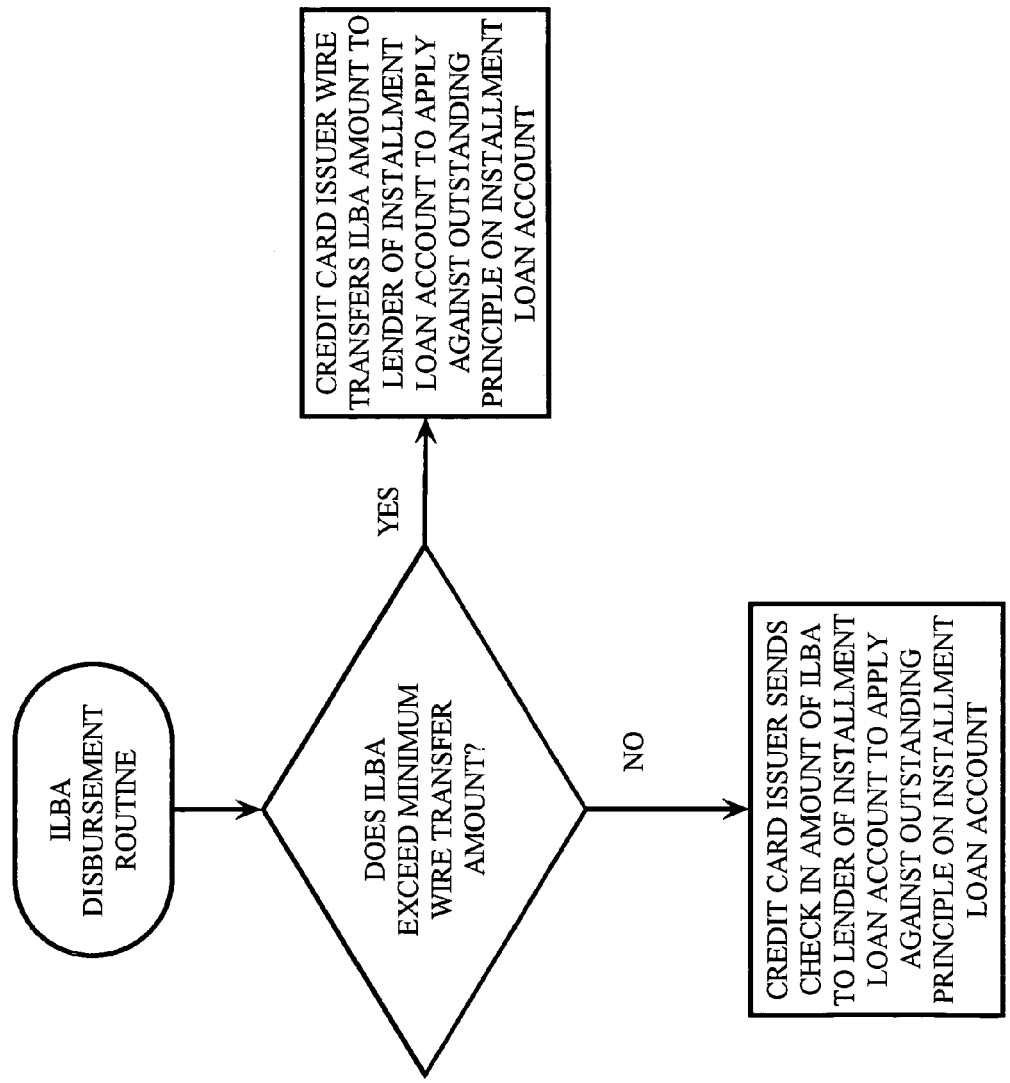

At step S9, the credit card issuer 10 makes a payment to the lending institution 30 in the amount of the ILBA for the benefit of the credit card holder 20 in the form of an advance payment to the lending institution 30 against the outstanding principal on the credit card holder's 20 installment loan account. Preferably, the payments to the lending institution 30 are made by electronic funds transfer. Most preferably, the payments to the lending institution 30 are made using alternative means depending upon the dollar amount of the ILBA, see FIG. 6. That is, the payment will preferably be made via electronic fund transfer if the dollar amount of the ILBA exceeds a specified minimum amount. If the dollar amount of the ILBA does not exceed the specified minimum amount, the payment will preferably be made via check.

We claim:

1. A credit card incentive system comprising:
   a credit card issuer computing system including a processor and a memory having a program residing therein for causing the processor to perform the steps of
      establishing a credit card account with the credit card issuer for a credit card holder having an account at a particular lending institution for an installment loan with a cost that requires a fixed number of periodic equal-sized payments made by the credit card holder to retire the loan,
      accumulating the total value of all purchases made by the card holder using the credit card during a period of time,
      checking to determine whether the credit card account is in good standing with the credit card issuer,
      calculating an installment loan benefit amount based on the accumulated value of purchases, if the credit card account is in good standing,
      determining whether there is an outstanding balance on the credit card holder's installment loan at the particular lending institution, and
      transferring the installment loan benefit amount to the particular lending institution to apply the installment loan benefit amount, as an additional payment, against the outstanding principal on the installment loan account, if the credit card account is in good standing and there is an outstanding principal balance, so as to reduce the cost of the installment loan.

2. The credit card incentive system of claim 1, the program being further configured to determine whether the installment loan at the particular lending institution has been refinanced by another lending institution, prior to the program determining whether there is an outstanding balance, and if the loan has been refinanced, obtain the loan status of the credit card holder's installment loan at the other lending institution, and receive notice that the particular lending institution is the other lending institution.

3. The credit card incentive system of claim 1, wherein transferring the installment loan benefit amount is performed by causing a wire transfer to the lending institution.

4. The credit card incentive system of claim 1, wherein transferring the installment loan benefit amount is performed by causing a check to be sent to the lending institution.

5. The credit card incentive system of claim 1, wherein transferring the installment loan benefit amount is performed by causing a wire transfer to the lending institution, if the amount of the payment exceeds a minimum value, and is performed by causing a check to be sent, otherwise.

6. The credit card incentive system of claim 1, wherein transferring the installment loan benefit amount is performed periodically.

7. The credit card incentive system of claim 1, wherein transferring the installment loan benefit amount is performed once a year.

8. The credit card incentive system of claim 7, wherein calculating an installment loan benefit amount is performed by calculating the value of goods and services purchased by the credit hard holder.

9. The credit card incentive system of claim 8, wherein calculating an installment loan benefit amount is performed by calculating a straight percentage of the value of goods and services purchased by the credit card holder.

10. The credit card incentive system of claim 8, wherein calculating an installment loan benefit amount is performed by determining a first threshold amount of the purchases and applying a first percentage to the first threshold amount to arrive at a first benefit amount, and determining a second threshold amount of the purchases and applying a second percentage to the second threshold amount less the first threshold amount to arrive at a second benefit amount, and adding the first and second benefit amounts to arrive at the installment loan benefit amount.

11. The credit card incentive system of claim 8, wherein calculating an installment loan benefit amount is performed by calculating a straight percentage of the amount of any interest charged to the credit card holder by the credit card issuer on the value of the goods and services purchased by the credit card holder.

12. The credit card incentive system of claim 8, wherein calculating an installment loan benefit amount is performed by determining a first threshold amount of the interest accrued during the period of time and applying a first percentage to the first threshold amount to arrive at a first benefit amount, and determining a second threshold amount of the interest accrued during the period of time and applying a second percentage to the second threshold amount less the first threshold amount to arrive at a second benefit amount, and adding the first and second benefit amounts to arrive at the installment loan benefit amount.

13. The credit card incentive system of claim 1, wherein the period of time is one year.

14. A computerized method for providing credit card incentive payments, comprising:

establishing a credit card account on a credit card issuer computer system for a credit card holder having an account at a particular lending institution for an installment loan with a cost that requires a fixed number of periodic equal-sized payments made by the credit card holder to retire the loan;

accumulating, on the card issuer computer system, the total value of all purchases made by the card holder using the credit card during a period of time;

checking to determine whether the credit card account is in good standing;

calculating, on the card issuer computer system, an installment loan benefit amount based on the accumulated value of purchases, if the credit card account is in good standing;

determining whether there is an outstanding balance on the credit card holder's installment loan at the particular lending institution; and transferring the installment loan benefit amount to the particular lending institution to apply the installment loan benefit amount, as an additional payment, against the outstanding principal on the installment loan account, if the credit card account is in good standing and there is an outstanding principal balance, so as to reduce the cost of the installment loan.

15. The credit card incentive system of claim 14, further comprising the steps of:

prior to determining whether there is an outstanding balance, determining whether the installment loan at the particular lending institution has been refinanced by another lending institution; and if the loan has been refinanced, obtaining the loan status of the credit card holder's installment loan at the other lending institution; and receiving notice that the particular lending institution is the other lending institution.

16. The method of claim 14, wherein the period of time is one year.

17. The method of claim 14, wherein calculating the installment loan benefit amount is performed by calculating a straight percentage of the value of all purchases made by the credit card holder during the period of time.

18. The method of claim 14, wherein calculating an installment loan benefit amount is performed by determining a first threshold amount of the purchases and applying a first percentage to the first threshold amount to arrive at a first benefit amount, and determining a second threshold amount of the purchases and applying a second percentage to the second threshold amount less the first threshold amount to arrive at a second benefit amount, and adding the first and second benefit amounts to arrive at the installment loan benefit amount.

19. The method of claim 14, wherein calculating the installment loan benefit amount includes:

calculating the value of all interest charged the credit card holder by the credit card issuer during the period of time; and calculating the sum of a straight percentage of the value of goods and services purchased by the credit card holder and a straight percentage of the interest charged the credit card holder by the credit card issuer during the period of time to arrive at the installment loan benefit amount.

20. The method of claim 14, wherein calculating the installment loan benefit amount includes:
   calculating the value of all interest charged the credit card holder by the credit card issuer during the period of time;
   calculating an incremented percentage of the value of goods and services purchased by the credit card holder by
      determining a first threshold amount of the purchases and applying a first percentage to the first threshold amount to arrive at a first benefit amount,
      determining a second threshold amount of the purchases and applying a second percentage to the second threshold amount less the first threshold amount to arrive at a second benefit amount, and
      adding the first and second benefit amounts;
   calculating a straight percentage of the interest charged the credit card holder by the credit card issuer during the period of time; and
   summing the calculated incremented percentage of the value of the purchases and straight percentage of the interest charged to arrive at the installment loan benefit amount.

21. The method of claim 14, wherein calculating the installment loan benefit amount includes:
   calculating the value of all interest charged the credit card holder by the credit card issuer during the period of time;
   calculating an incremented percentage of the value of goods and services purchased by the credit card holder by
      determining a first threshold amount of the purchases and applying a first percentage to the first threshold amount to arrive at a first purchase benefit amount,
      determining a second threshold amount of the purchases and applying a second percentage to the second threshold amount less the first threshold amount to arrive at a second purchase benefit amount, and
      adding the first and second purchase benefit amounts;
   calculating an incremented percentage of the interest charged the credit card holder by
   determining a first threshold amount of the interest accrued during the period of time and applying a first percentage to the first threshold amount to arrive at a first interest benefit amount, and
   determining a second threshold amount of the interest accrued during the period of time and applying a second percentage to the second threshold amount less the first threshold amount to arrive at a second interest benefit amount, and
   adding the first and second interest benefit amounts; and
   summing the calculated incremented percentage of the value of the goods and the incremented percentage of the interest charged to arrive at the installment loan benefit amount.

22. The method of claim 14, wherein calculating the installment loan benefit amount includes:
   calculating the value of all interest charged the credit card holder by the credit card issuer during the period of time; and
   calculating the sum of a straight percentage of the value of goods and services purchased by the credit card holder using the credit card issued by the credit card issuer;
   calculating an incremented percentage of the interest charged the credit card holder by the credit card issuer during the period of time by
      determining a first threshold amount of the interest accrued during the period of time and applying a first percentage to the first threshold amount to arrive at a first interest benefit amount, and
      determining a second threshold amount of the interest accrued during the period of time and applying a second percentage to the second threshold amount less the first threshold amount to arrive at a second interest benefit amount, and adding the first and second interest benefit amounts; and
   summing the calculated straight percentage of the value of the purchases and the calculated incremented percentage of interest charged to arrive at the installment loan benefit amount.

23. A computer-readable medium having a computer program with computer-executable instructions for performing a method comprising:
   establishing a credit card account on a credit card issuer computer system for a credit card holder having an account at a particular lending institution for an installment loan with a cost that requires a fixed number of periodic equal-sized payments made by the credit card holder retire the loan;
   accumulating, on the card issuer computer system, the total value of all purchases made by the card holder using the credit card during a period of time;
   checking to determine whether the credit card account is in good standing;
   calculating, on the card issuer computer system, an installment loan benefit amount based on the accumulated value of purchases, if the credit card account is in good standing;
   determining whether there is an outstanding balance on the credit card holder's installment loan at the particular lending institution; and
   transferring the installment loan benefit amount to the particular lending institution to apply the installment loan benefit amount, as an additional payment, against the outstanding principal on the installment loan account, if the credit card account is in good standing and there is an outstanding principal balance, so as to reduce the cost of the installment loan.

24. The credit card incentive system of claim 23, further comprising the steps of:
   prior to determining whether there is an outstanding balance, determining whether the installment loan at the particular lending institution has been refinanced by another lending institution; and
   if the loan has been refinanced,
      obtaining the loan status of the credit card holder's installment loan at the other lending institution; and
      receiving notice that the particular lending institution is the other lending institution.

* * * * *